D. B. HUNT.
Car Axle.

No. 89,767.

Patented May 4, 1869.

Witnesses
George Stead.
John L. Constable.

Inventor
David Brown Hunt

United States Patent Office.

DAVID BROWN HUNT, OF SAN FRANCISCO, CALIFORNIA.

Letters Patent No. 89,767, dated May 4, 1869.

IMPROVED DIVIDED AXLE FOR RAILWAY-CARS.

The Schedule referred to in these Letters Patent and making part of the same.

*To all whom it may concern:*

Be it known that I, DAVID BROWN HUNT, of the city and county of San Francisco, State of California, have invented a certain new Improvement in the Manner of Constructing Car-Axle Couplings; and I do hereby declare that the following is a full, clear, and exact description of the same, reference being had to the accompanying drawings, making a part of this specification, in which—

Figure 3 shows the axle separately.

The device is intended to allow for independent action of each wheel attached to the axles of railroad-cars, &c., as is found desirable when these vehicles are rounding curves in the track.

The device accomplishes this by dividing the axle into two pieces, and afterwards joining the separated parts together by a peculiarly-formed coupling, which, whilst it shall firmly bind the parts of the axle together, may not interfere with their independent revolution.

This, as a principle, is old and well known, and has doubtless been in use, but owing to the complicated and expensive manner in which this principle has heretofore been carried out, its adoption has not become general.

It has been the design of the inventor to simplify and cheapen the construction of these couplings, without prejudice to their effectiveness, and the subjoined description of my improved coupling will enable others skilled in the art to make and use the same.

I take an ordinary car-axle, A A', and cut it in two pieces, at the line *o o*, and for a distance corresponding to the entire length of my coupling, or sleeve B, plus the width of the collar C, say about twenty inches in all, for ordinary axles.

I turn off my axle, A, being careful to take away as little metal as possible, so as not to unnecessarily weaken the same.

I also turn off the other part of the axle A', for, say, eight inches, corresponding to the distance the coupling will cover. The diameter of this part must correspond with the outside diameter of the collar C.

Figure 1:
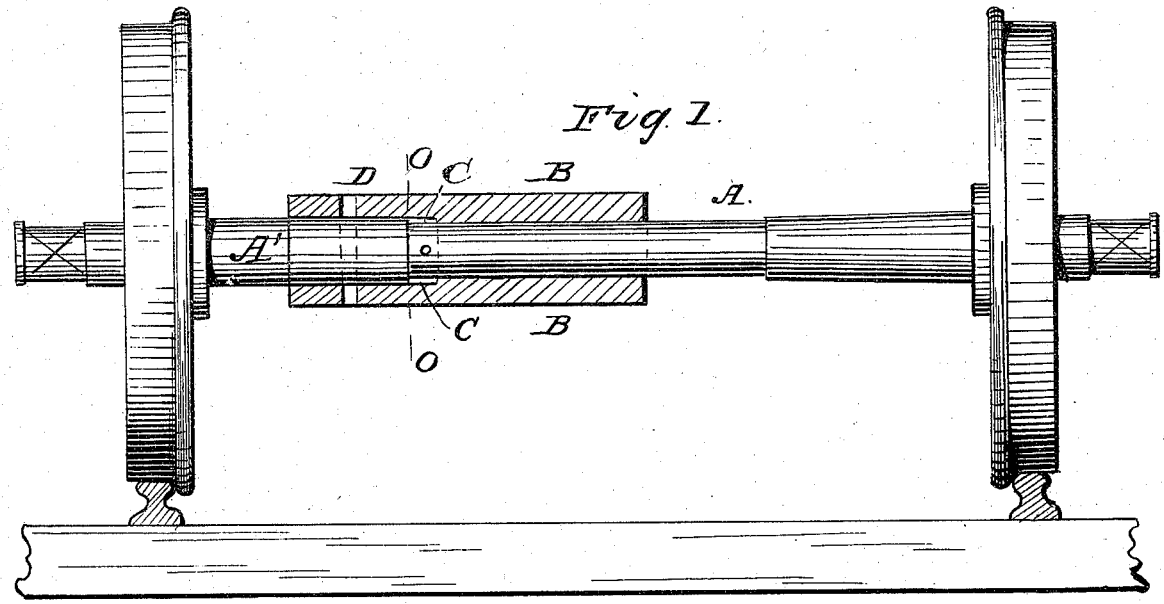
Figure 1 shows my improvement, in section, as applied on the axle.
Figure 2:
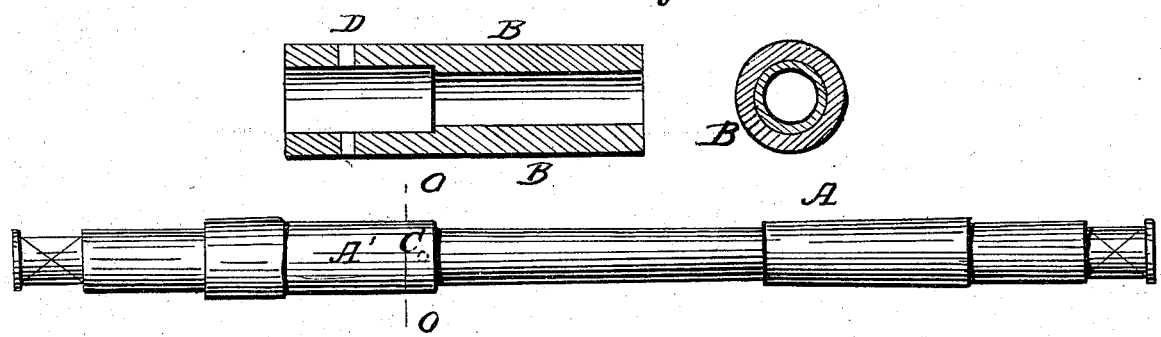
Figure 2 shows a longitudinal section of my coupling, separately.

The coupling, or sleeve B is simply a cylinder of wrought-iron, say about eighteen inches long, bored to fit the two diameters of the separated parts of the axle. (See fig. 2.)

C is a collar, say three-eighths of an inch thick, and two inches wide, which is firmly pinned or riveted on the end of the axle A, after the sleeve or coupling B has been drawn on.

D is a tapering pin, which is driven tightly through the sleeve B and axle A'.

In applying the coupling, I first slide it over the end of the axle A, as far up as to admit the placing of the collar C, which collar I then rivet or pin to the axle; the coupling is then drawn forward, and the other end of the axle A' is introduced, which end is butted up against the continuing part of the axle A; the pin D is then driven tightly into the sleeve and axle, and thus the separated parts of the axle are again solidly bound together.

I wish it distinctly understood that I make no claim to originality in dividing the axle, and afterwards coupling together by a sleeve, but my invention consists in an improved manner of accomplishing the same. Therefore,

What I claim as my invention, and desire to secure by Letters Patent, is—

The collar C, secured on the end of one part of the axle, in combination with the sleeve-piece B, secured to the other part of the axle as a means of keeping the divided axle together.

DAVID BROWN HUNT.

Witnesses:
GEORGE STEAD,
JOHN L. CONSTABLE.